United States Patent
Ovesjö et al.

(10) Patent No.: US 6,542,484 B1
(45) Date of Patent: Apr. 1, 2003

(54) CODE ALLOCATION FOR RADIOCOMMUNICATION SYSTEMS

(75) Inventors: Fredrik Ovesjö, Solna (SE); Jonas Karlsson, Kista (SE); Sara Mazur, Bromma (SE); Fredric Kronestedt, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/079,355

(22) Filed: May 15, 1998

(51) Int. Cl.[7] ............................................. H04B 7/216
(52) U.S. Cl. ....................................... 370/335; 370/342
(58) Field of Search ................................. 370/329, 332, 370/334, 335, 341, 342; 455/13.3, 25, 509, 63, 560, 562, 456; 375/130, 140, 146, 147

(56) References Cited

U.S. PATENT DOCUMENTS

| | | | | |
|---|---|---|---|---|
| 5,353,352 A | | 10/1994 | Dent et al. ..................... 380/37 |
| 5,475,864 A | * | 12/1995 | Hamabe ..................... 455/33.1 |
| 5,550,809 A | | 8/1996 | Bottomley et al. ........... 370/18 |
| 5,592,490 A | * | 1/1997 | Barrett et al. ............... 370/310 |
| 5,603,082 A | * | 2/1997 | Hamabe ..................... 455/450 |
| 5,619,526 A | * | 4/1997 | Kim et al. .................. 370/335 |
| 5,678,187 A | | 10/1997 | Meidan et al. ............. 455/33.3 |
| 5,781,845 A | * | 7/1998 | Dybdal et al. ................ 455/65 |
| 5,831,977 A | * | 11/1998 | Dent ........................... 370/335 |
| 5,926,761 A | * | 7/1999 | Reed et al. .................. 455/440 |
| 5,982,324 A | * | 11/1999 | Watters et al. ......... 342/357.01 |
| 6,021,330 A | * | 2/2000 | Vannucci .................... 455/456 |
| 6,069,883 A | * | 5/2000 | Ejzak et al. ................ 370/335 |
| 6,122,260 A | * | 9/2000 | Liu et al. .................... 370/310 |
| 6,141,542 A | * | 10/2000 | Kotzin et al. ............... 370/331 |
| 6,154,657 A | * | 11/2000 | Grubeck et al. ............ 455/456 |

FOREIGN PATENT DOCUMENTS

WO          WO95/22210          8/1995

OTHER PUBLICATIONS

European Search Report re RS 101118 Date of mailing of search: Jan. 25, 1999.

* cited by examiner

Primary Examiner—Chau Nguyen
Assistant Examiner—Andy Lee

(57) ABSTRACT

Multiple code sets are introduced in the downlink of a CDMA system to allow for more connections in each cell. The codes are then allocated to different users taking into account the interference therebetween. The interference depends on the antenna gains, transmission powers used and cross-correlations between codes. By estimating these parameters the interference can be minimized in the code allocation process. Since the allocation of codes and code sets to geographical areas within a cell may change over time, code handoff is supported.

22 Claims, 8 Drawing Sheets

CODE ALLOCATION FOR RADIOCOMMUNICATION SYSTEMS

BACKGROUND

This invention generally relates to spread spectrum radiocommunication systems and, more particularly, to techniques for efficiently allocating spreading codes used to spread information to be transmitted in such systems.

Cellular radio communication systems have recently been developed that use spread spectrum modulation and code division multiple access (CDMA) techniques. In typical direct sequence (DS) CDMA system, an information data stream to be transmitted is superimposed on a much-higher-symbol-rate data stream sometimes known as a spreading sequence. Each symbol of the spreading sequence is commonly referred to as a chip. Each information signal is allocated a unique spreading code that is used to generate the spreading sequence typically by periodic repetition. The information signal and the spreading sequence are typically combined by multiplication in a process sometimes called coding or spreading the information signal. A plurality of spread information signals are transmitted as modulations of radio frequency carrier waves and are jointly received as a composite signal at a receiver. Each of the spread signals overlaps all of the other coded signals, as well as noise-related signals, in both frequency and time. By correlating the composite signal with one of the unique spreading sequences, the corresponding information signal can be isolated and decoded.

As radiocommunication becomes more widely accepted, it will be desirable to provide various types of radiocommunication services to meet consumer demand. For example, support for facsimile, e-mail, video, internet access, etc. via radiocommunication systems is envisioned. Moreover, it is expected that users may wish to access different types of services at the same time. For example, a video conference between two users would involve both speech and video support. Some of these different services will require relatively high data rates compared with speech service that has been conventionally supplied by radio communication systems, while other services will require variable data rate service. Thus, it is anticipated that future radio communication systems will need to be able to support high data rate communications as well as variable data rate communications.

Wideband DS-CDMA is regarded as one candidate for next generation radiocommunication systems that will supply such high data rate communication services. Despite the relatively high spectral efficiency inherent in wideband DS-CDMA techniques, there may be a need to improve the performance of these techniques in order to provide the required high data rates and quality. One proposed technique for augmenting wideband DS-CDMA systems is to use adaptive antennas to transmit signals in wideband DS-CDMA systems. Adaptive antennas direct signal energy associated with specific mobile units into specific geographical areas so that mobile units outside of those areas are not interfered by that signal energy. The use of adaptive antennas in wideband DS-CDMA systems mitigates the self-interference limitation inherent to CDMA systems to an extent that such systems may instead be limited by the number of available spreading codes.

To Applicants' knowledge, this problem of code limitation is not widely recognized since CDMA systems have traditionally been unable to tolerate the interference associated with transmitting signals using all of the available codes in a set. To better understand this new problem, it is helpful to understand how code sets are used in conventional CDMA systems.

In traditional DS-CDMA systems, different cells use different sets of codes for communication. By having reasonably low cross-correlation between the codes in one set and the codes in other sets, the available frequency bandwidth can be completely reused in each cell. Each code set typically contains a plurality of orthogonal spreading codes that are used to separate different physical channels within the cell. This helps to reduce the downlink intra-cell interference, especially in propagation environments with few multipath components, but also in other, more time dispersive, environments. The number of available orthogonal codes of a certain length is equal to the length of the code, i.e., for a 64 bit code, there are 64 orthogonal codes in each set.

As mentioned earlier, it has conventionally not been possible to simultaneously use all of the codes in a set to transmit information on the downlink due to the self-interference between the transmissions. However, with the introduction of adaptive antennas the interference in the downlink can be reduced to an extent that it will be possible to significantly increase system capacity. For example, shifting from a conventional one antenna implementation to N antennas can provide a capacity increase on the order of N. Under these circumstances, the number of codes available may be the limiting capacity factor rather than downlink interference.

Accordingly, it would be desirable to create new techniques and systems for allocating codes in a flexible manner that permits code reuse sufficient to exploit the full capacity increase potential available by using adaptive antennas in wideband DS-CMDA systems.

SUMMARY

These and other problems associated with previous communication systems are solved by Applicants' invention, wherein multiple downlink spreading code sets are managed in such a way as to minimize interference between users in radio-communication systems using adaptive antennas. Interference between users is dependent on the antenna gain used for transmission to the users, the transmission power and the cross-correlation between the users' codes. Thus, the present invention uses knowledge of these parameters in allocating codes to users in a manner intended to reduce interference.

For example, mobile stations having antenna gains that interfere severely with each other can be allocated codes having the best cross-correlation properties, i.e., codes in the same code set. In systems which use direction-of-arrival (DOA) information to determine how to steer the downlink signals toward a particular mobile station, this same DOA information can be used as an indicator of how severely different mobile stations' antenna gains will interfere with each other. Thus, exemplary embodiments of the present invention can allocate codes from one set to the right half of a cell and codes from another set to the left half of a cell in order to minimize interference. In this way, the relatively high cross-correlation between intra-cell transmissions using codes in different sets is suppressed by the gain of the antenna gain.

BRIEF DESCRIPTION OF THE DRAWINGS

The features and objects of Applicants' invention will be understood by reading this description in conjunction with the drawings, in which.

DETAILED DESCRIPTION

Figure 1:
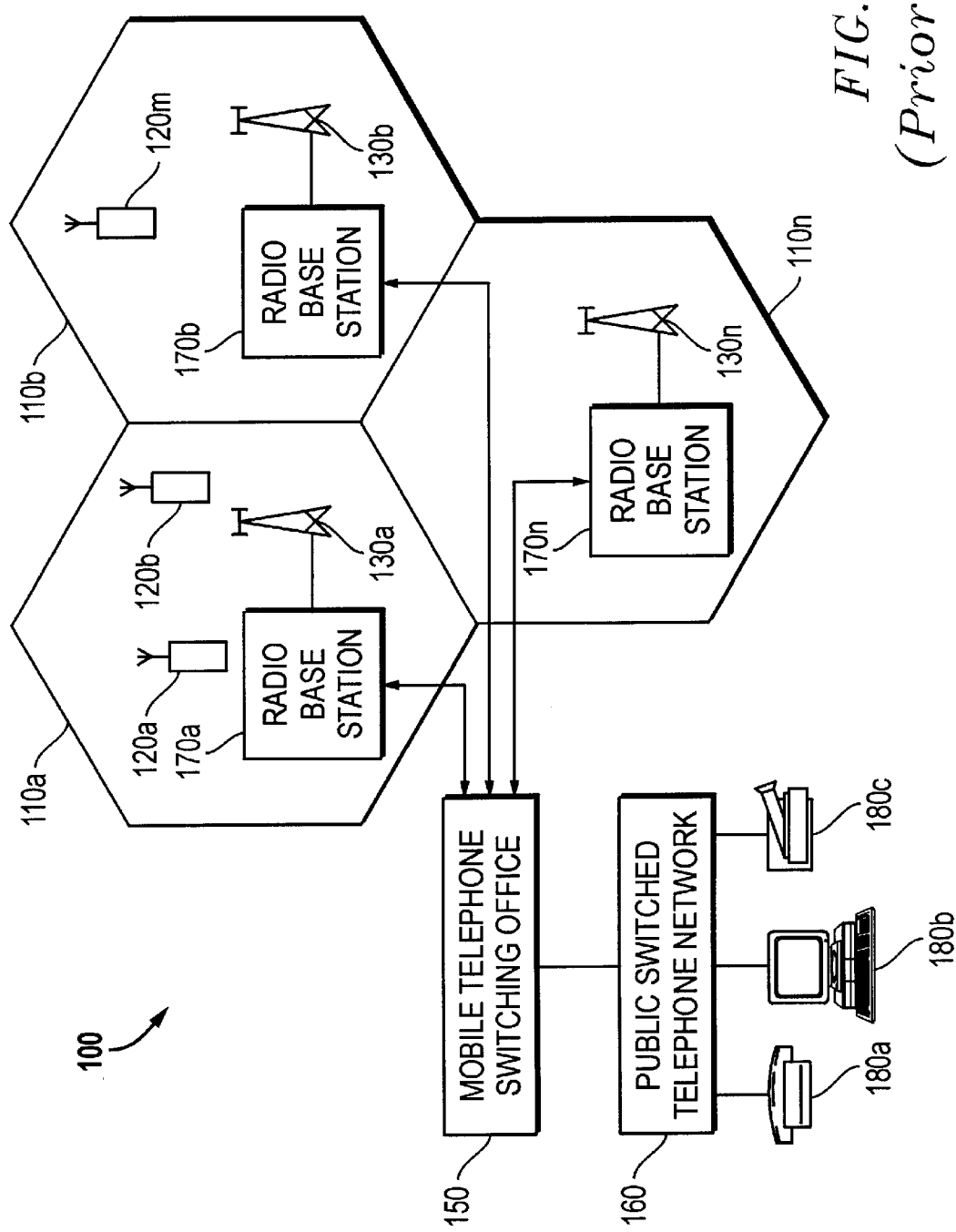
FIG. 1 is a diagram of an exemplary, conventional radiocommunication system in which the present invention can be implemented.

While this description is written in the context of cellular communications systems involving portable or mobile radio telephones, it will be understood by those skilled in the art that Applicants' invention may be applied to other communications applications. FIG. 1 illustrates an example of a conventional cellular radio communication system 100. The radio communication system 100 includes a plurality of radio base stations 170a–n connected to a plurality of corresponding antennas 130a–n. The radio base stations 170a–n in conjunction with the antennas 130a–n communicate with a plurality of mobile terminals (e.g. terminals 120a, 120b and 120m) within a plurality of cells 110a–n. Communication from a base station to a mobile terminal is referred to as the downlink, whereas communication from a mobile terminal to the base station is referred to as the uplink.

The base stations are connected to a mobile telephone switching office (MSC) 150. Among other tasks, the MSC (via its connection to a radio network controller (RNC)) coordinates the activities of the base stations, such as during the handoff of a mobile terminal from one cell to another. The MSC, in turn, can be connected to a public switched telephone network 160, which services various communication devices 180a, 180b and 180c.

According to exemplary embodiments of the present invention, DS-CDMA systems can support high bit rate services using physical channels organized in frames of equal length (timewise). Each frame carries an integer number of chips and an integer number of information bits. The physical channels carrying the data and the control information (e.g., including pilot/reference symbols for channel estimation, power control commands and rate information of the data) can be denoted as physical data channel (PDCH) and physical control channel (PCCH). Each connection between a mobile station and a base station will be supported by a PCCH and at least one PDCH.

Figure 2:
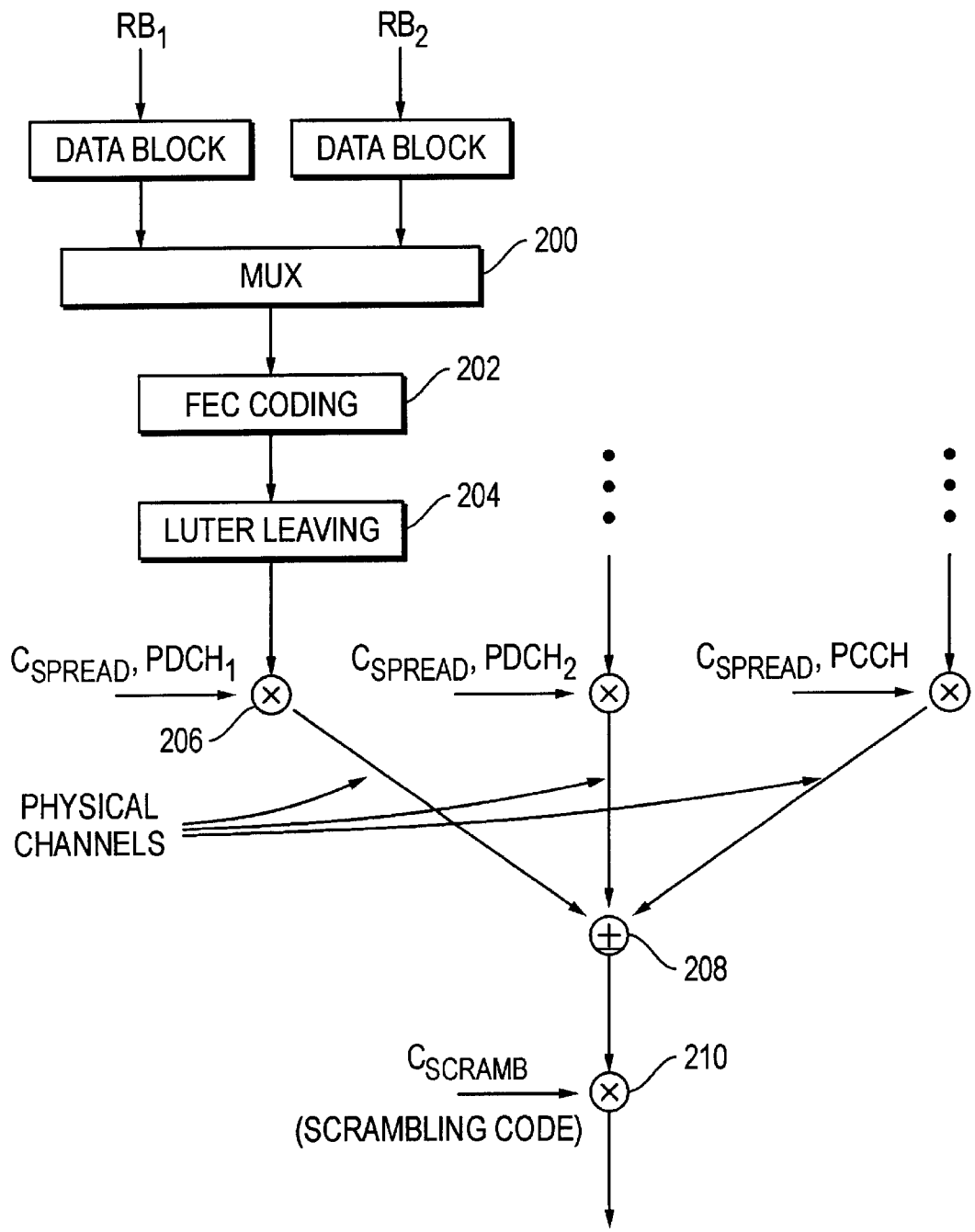
FIG. 2 illustrates the usage of spreading codes and scrambling codes in a CDMA transmitter.

This concept is illustrated in FIG. 2 wherein two radio bearers (RB1 and RB2) provide data blocks to multiplexor 200. The selected blocks are provided with forward error correction (FEC) coding at block 202 and are then interleaved at block 204 prior to being spread using the channelization code associated with PDCH1 at block 206. Similar branches, not completely shown, can be provided for PDCH2 and the PCCH. Each of the resulting physical channels is then summed at block 208 and scrambled at block 210 using a scrambling code prior to transmission. Modulation, amplification and coupling to an antenna are provided downstream, although not shown in this figure.

As mentioned above, a code set describes the combination of a set of channelization codes and a particular scrambling code, which set has some preferred correlation property (e.g., orthogonality). Techniques for creating and manipulating code sets are described in Swedish Patent Application No. SE9703161-1, entitled "Methods for Telecommunication" filed on Sep. 2, 1997 to Erik Dahlman, the disclosure of which is incorporated here by reference. Applicants have created techniques and systems for determining from which code set to allocate a code to particular mobile stations/connections as described below in conjunction with systems which employ adaptive antennas. Although the following exemplary embodiments are described in connection with an adaptive antenna array disposed at a base station in a radiocommunication system, those skilled in the art will appreciate that these concepts apply equally to other systems, e.g., systems using spatially distributed antennas wherein a signal can be transmitted using one or several of the antennas.

Figure 3:
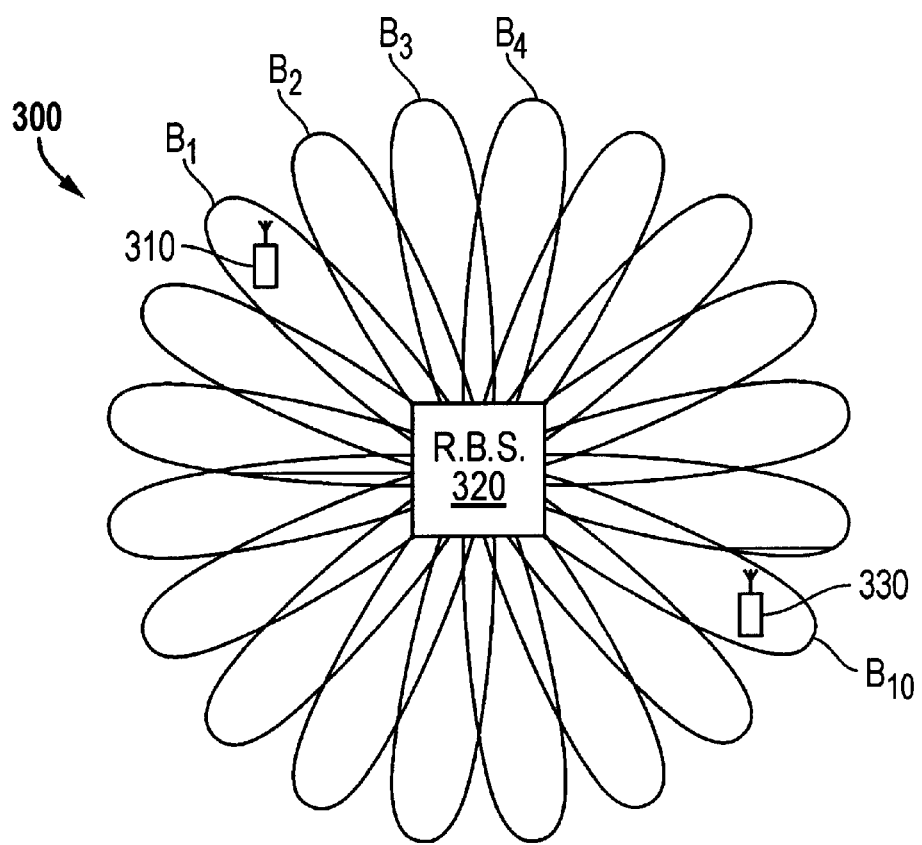
FIG. 3 illustrates the usage of relatively narrow beams to provide radiocommunication services.

FIG. 3, for instance, illustrates such an exemplary radio communication system 300 including a radio base station 320 employing a fixed-beam phased array (not shown). The phased array generates a plurality of fixed narrow beams ($B_1$, $B_2$, $B_3$, $B_4$, etc.) which radially extend from the base station 320. Preferably, the beams overlap to create a contiguous coverage area to service a radio communication cell. Although not shown, the phased array can actually consist of three phased array sector antennas, each of which communicates with a 120° swath extending from the base station 320.

FIG. 3 shows a mobile terminal 310 located within the coverage of one of the beams, $B_1$. Communication proceeds between the base station 320 and this mobile terminal 310 using the beam $B_1$, or perhaps, in addition, one or more adjacent beams. Likewise a second mobile terminal 330 communicates with the base station 320 using, at least, beam $B_{10}$. The reader will appreciate that modern radio communication environments typically include many more mobile terminals within cells, however the two illustrated are sufficient to describe operation of these exemplary embodiments of the present invention.

Figure 4:
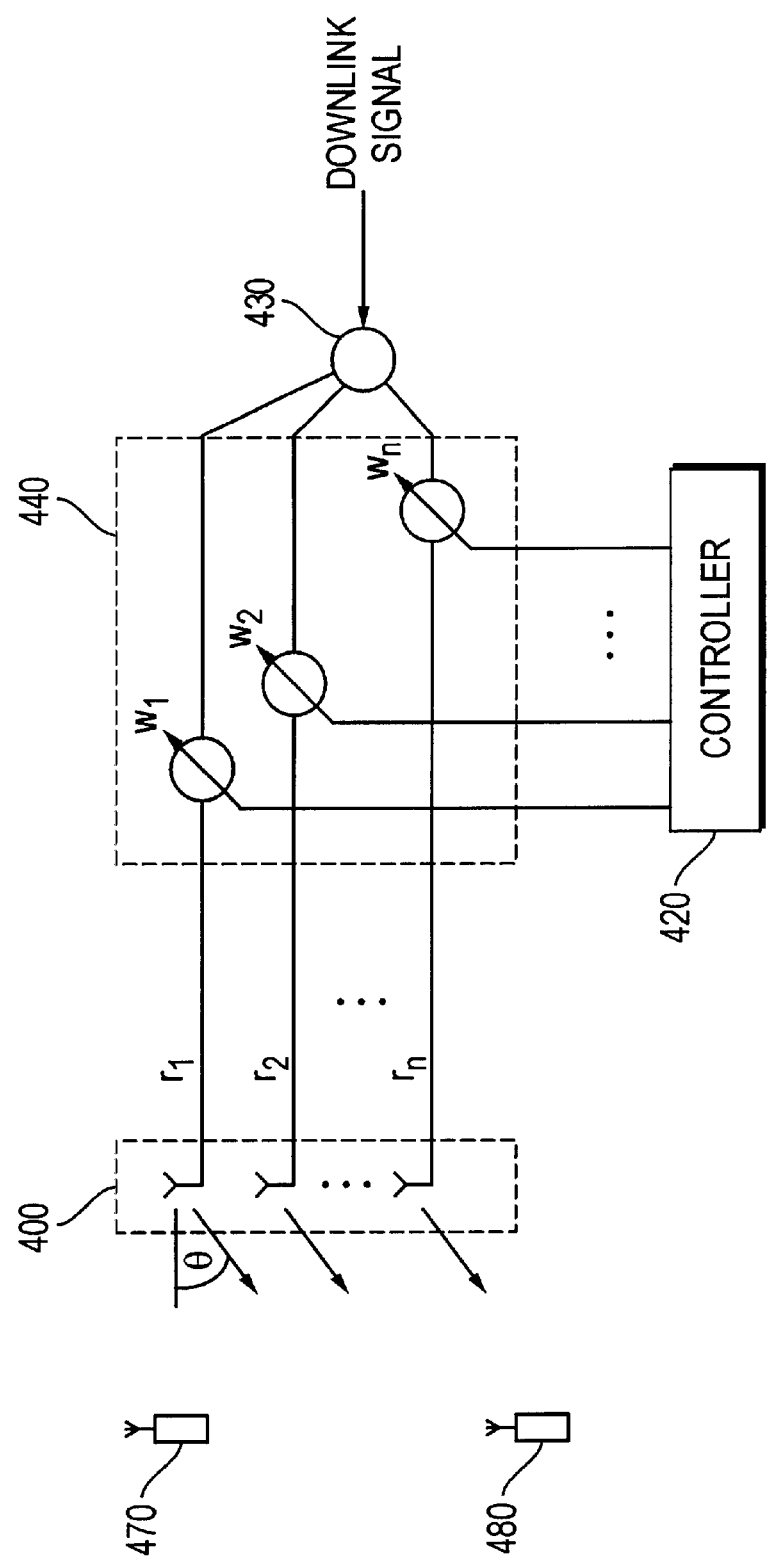
FIG. 4 is a block diagram of an exemplary transmitter using an adaptive array antenna structure.

Adaptive arrays allow for, among other things, the selective transmission of signals in a particular direction. For instance, as shown in FIG. 4, an array 400 can be used to transmit a signal at an angle $\Theta$ (with respect to the normal of the array) toward a target mobile terminal 480, while minimizing transmission of signal energy intended for mobile terminal 480 in the direction of mobile terminal 470. This is accomplished by selecting (complex) weights ($w_1$, $w_2$, ... $w_n$) applied to each signal path ($r_1$, $r_2$, ... $r_n$) to the phased array antenna 400 so as to increase the transmit power of the array in certain angular directions and reduce the transmit power of the array in other directions (i.e., effectively steering a null toward unintended receiver(s)). The desired weighting is selected by changing the weighting values used in beamforming unit 440 by controller 420. Thus, the downlink signal is split at unit 430, weighted for each antenna element in unit 440 and transmitted via the phased array antenna 400.

Since the adaptive antenna array "steers" signal energy toward an intended mobile station, and therefore away from mobile stations with which that signal energy will interfere, it becomes possible to use multiple code sets within the same cell. However, the codes should be allocated from these sets in such a way as to minimize the interference caused by the reduction in orthogonality which is introduced by the different code sets. This is accomplished by spatially separating, to the extent possible, the direction in which signals are transmitted using codes from different sets. Several examples will illustrate code allocation and management according to the present invention. Although the following description illustrates code allocation decisions being made in the base station, those skilled in the art will appreciate that these decisions can be made anywhere in the radiocommunication system, e.g., in a radio network controller, the MSC 150, or some combination of these three entities.

Consider again the example illustrated in FIG. 3. According to the present invention base station 320 will be assigned some predetermined number of code sets with which to support communication services, each set having a plurality of codes, from which at least one code is allocated for each connection to a remote station. To simplify this example, assume that this particular base station 320 has two code sets. Since the cross-correlation between code sets is higher than between codes in the same set, it is advantageous to use as few code sets as possible to support communications in any given cell. Thus, although mobile stations 310 and 330 are disposed on roughly opposite sides of the cell, base station 320 would allocate codes from a first code set to support communication with these two mobile stations if the loading in that cell was light enough that the number of codes in the first code set was sufficient to satisfy capacity demands. The selection of which code set to allocate from first may be based upon the cross-correlation properties of each code set available to the base station.

As more mobile stations become active in the cell, base station 320 may run out of codes in the first code set. At this time, the base station 320 would begin to use codes from the second code set. In order to minimize the additional interference that this will cause within the cell, base station 320 uses spatial information associated with the mobile stations' positions to determine which mobile stations should use connections transmitted using codes in the second set.

This same spatial information is already available in the base station and is also used to identify which of the narrow beams supported by the antenna array should be used to support the connection, i.e., to determine the antenna gain associated with each element for "steering" an energy's signal energy in an appropriate direction. Those skilled in the art will appreciate that there are many techniques which can be used to determine an appropriate antenna gain and that the present invention can allocate codes based on antenna gain determined in any manner.

One technique for determining an appropriate antenna gain is to estimate a mobile station's position or direction. Performing location estimation using array antennas can, for example, be accomplished by connecting each beam in the array to its own, dedicated radio receiver. Then, when a remote terminal transmits to the transceiver, e.g., sends an access burst on the random access channel (RACH), the signal strength and phase can be determined for each beam. The received signal strength and phase in each beam can be used to determine a location estimate using any of the known direction-of-arrival (DOA) algorithms. It is also possible that, in some systems, the mobile station may be responsible for determining and reporting its location using, for example, GPS technology or by measuring time-of-arrival associated with pilot signal transmissions.

Base station 320 uses this location information to determine in which areas of the cell it will use codes from the first code set and which areas of the cell it will use codes from the second code set. As a relatively simple example, base station 320 could use codes from a first set to establish communications with a newly active mobile station in one-half of the cell (e.g., that containing mobile station 310) and codes from a second set of the cell to establish communications with a newly active mobile station in the second half of the cell (e.g., that containing mobile station 330).

Moreover, once base station 320 has exhausted the codes in the first set and begins to use codes from the second set, it may be advantageous to reallocate codes associated with existing connections rather than merely allocating codes from the second set as new mobile stations become active in the cell. For example, once base station 320 begins to allocate codes from the second set, it may wish to handoff the existing connection between the system and mobile station 330 from a channel using a code from the first set to a channel using a code from a second set to minimize intra-cell interference. This decision to reallocate codes to existing connections will be made, at least in part, based upon a current location of the mobile stations having active connections with the system and based upon an area in which the base station decides to use codes from the second set.

Thus, code allocation techniques according to exemplary embodiments of the present invention can be generalized into two categories, methods for allocating codes to newly active mobile stations in a cell and methods for handling the allocation of codes to mobile stations which have already been allocated a code within the cell. Each of these exemplary techniques will now be described with reference to the flowcharts of FIGS. 5 and 6, respectively.

Figure 5:
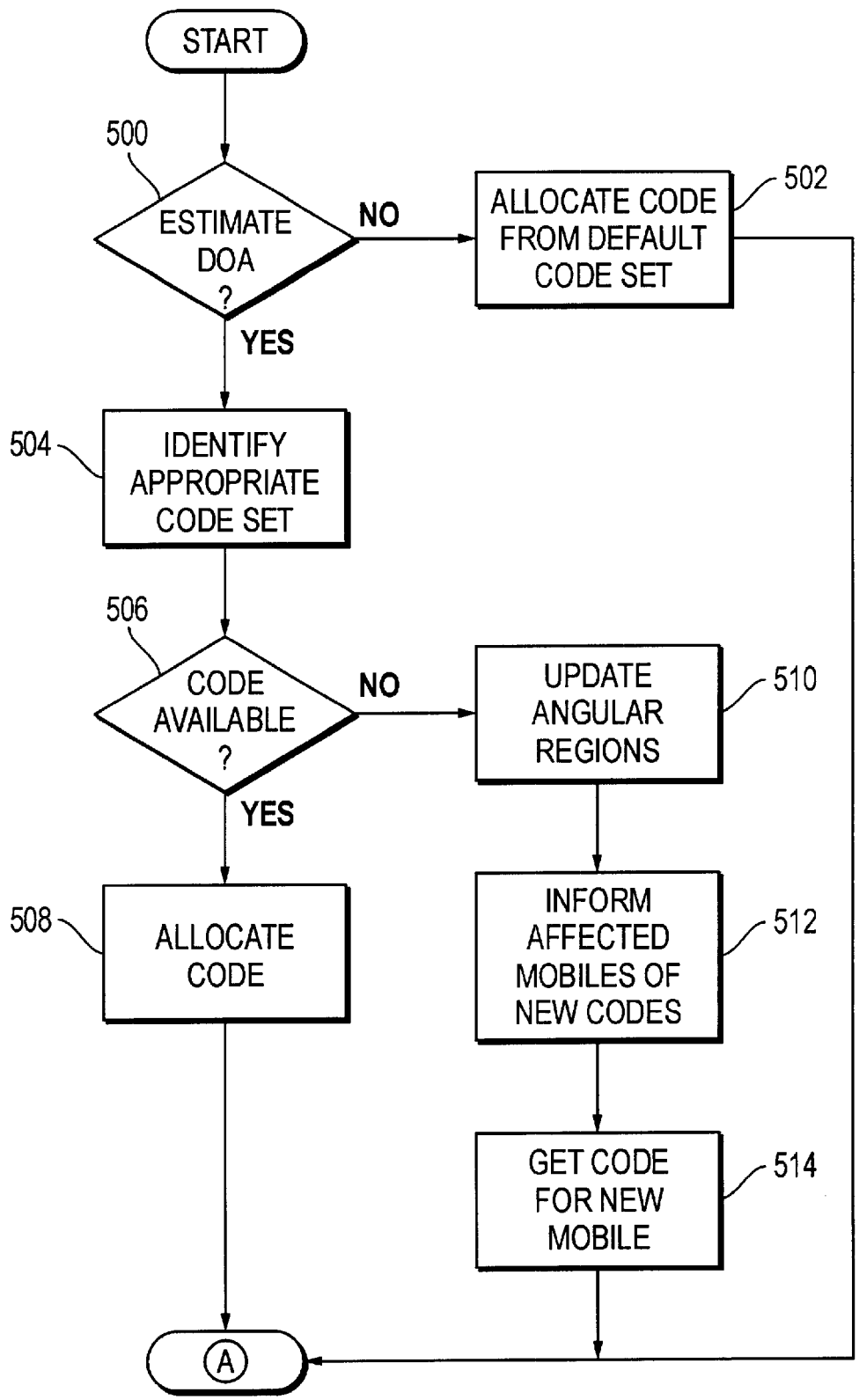
FIG. 5 is a flowchart illustrating the allocation of codes to support connections according to an exemplary embodiment of the present invention.
Figure 6:
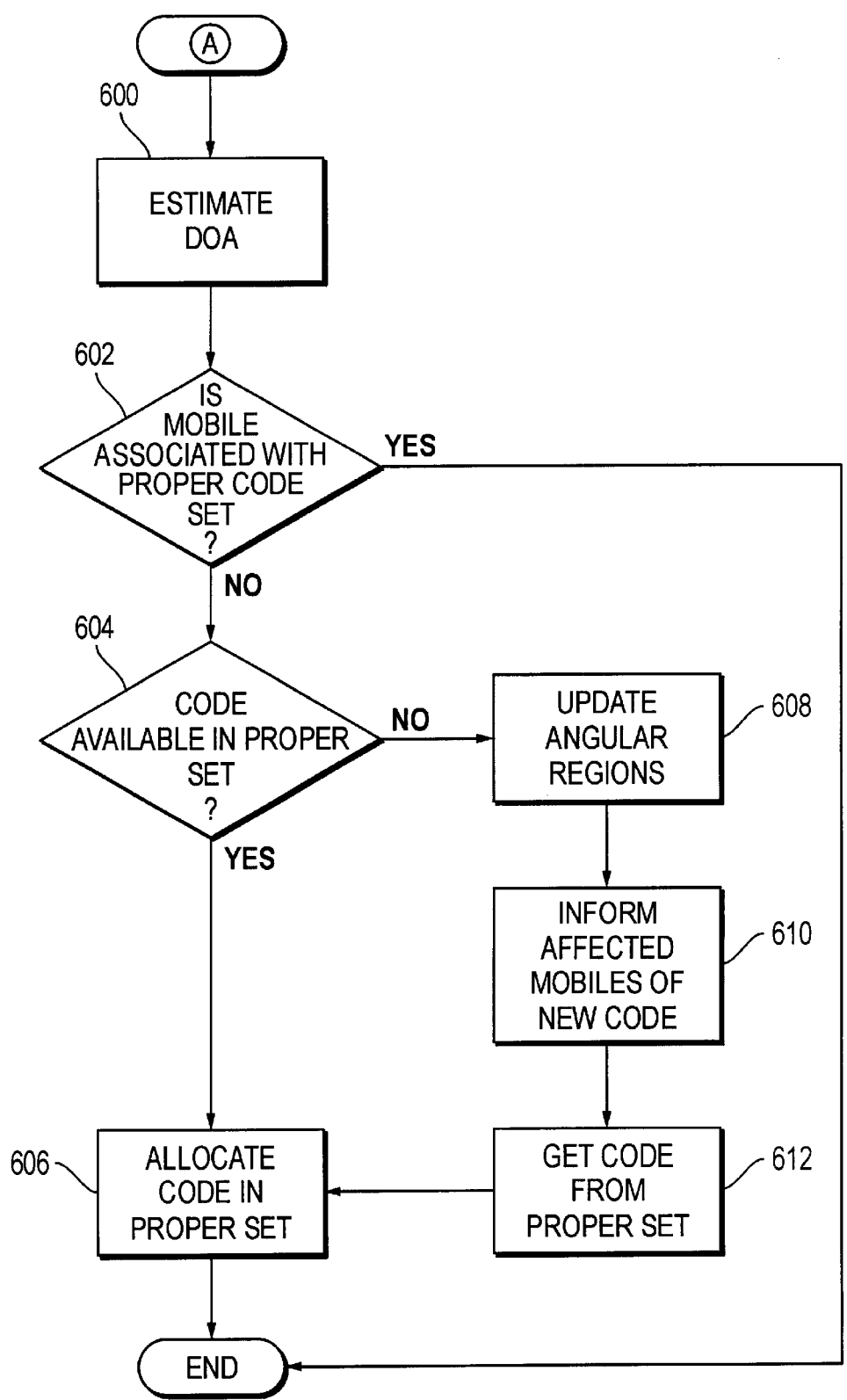
FIG. 6 is a flowchart illustrating the allocation of codes to support connections according to an exemplary embodiment of the present invention.

In FIG. 5, an attempt is made to estimate a new mobile station's position, or at least estimate an angular direction of the mobile station relative to the base station, at step 500. As mentioned above, this can be performed by the mobile station or the system. If performed by the base station, the access on the RACH can be evaluated to determine an angular direction of the mobile station. If the system is successful in estimating a position or angular direction for the new mobile station, then it identifies an appropriate code set at step 504. However, there may be occasions when the received burst is insufficient to determine the mobile station's angular position. In such cases, a code is selected from a default set of codes, usually the first set of codes, for the mobile station to use at least temporarily to establish its traffic channel(s) at step 502. If there is only one set of codes currently in use, then the system will select a code from that set regardless of the mobile station's estimated position or angular direction in order to keep intra-cell interference at a minimum. Thus, if a code is available in the identified set at step 506, the flow proceeds to block 508 where a code from that set is allocated and the call is set-up using the selected code.

If the identified code set is fully utilized at step 506, then the system will take measures to obtain a code for the new mobile's connection. One possibility is that the system will evaluate the existing connections that are using codes within the identified set to try to release a code for the new connection. For example, the system can take this opportunity to evaluate those mobile stations that are in soft handoff/macrodiversity (wherein multiple transmission sources, e.g., beams or base stations, are providing substantially the same information to a mobile station over two channels) mode and release weaker branches that are being received by mobile stations at below some threshold. This type of activity may release a code in the identified code set for the new mobile station's connection.

Alternatively, the base station (or system) may opt to begin using another of the plurality of code sets assigned thereto. If so, then the process moves to step 510 in FIG. 5 wherein the base station updates the assignment of code sets to angular regions. This step is conceptually illustrated in FIGS. 7(*a*) and 7(*b*). For example, if a first code set is currently being used in a first geographical area and a second code set is currently being used in a second geographical area then the association between code sets and geographical areas could, for example, be as illustrated in FIG. 7(*a*).

Figure 7A:
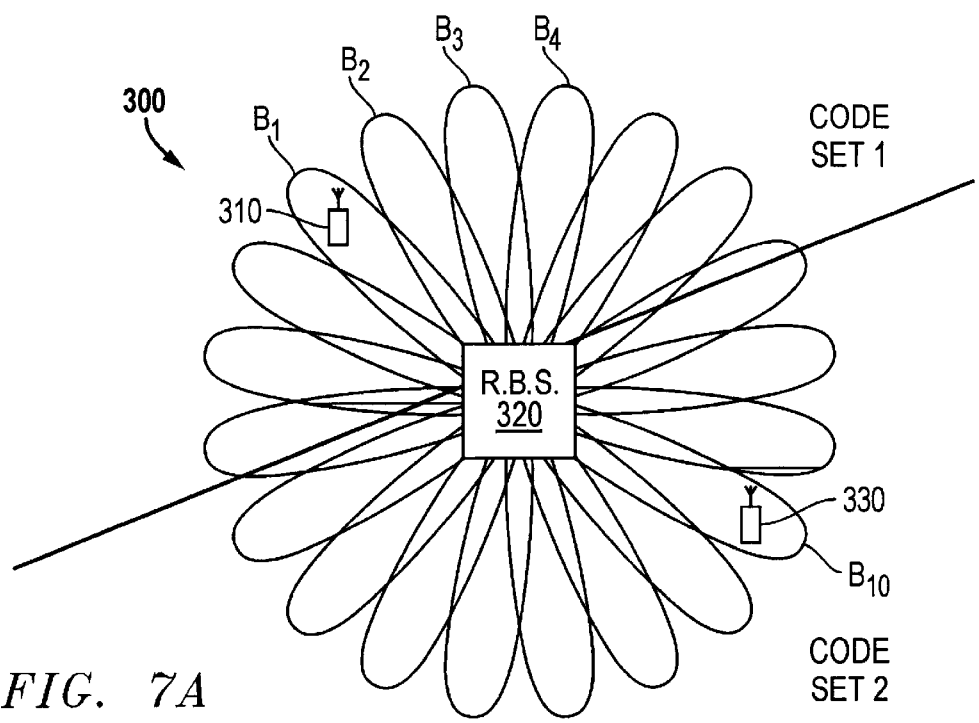
FIGS. 7 (a)–7(c) provide conceptual illustrations of the dynamic association between code sets and geographic areas within a cell.
Figure 7B:
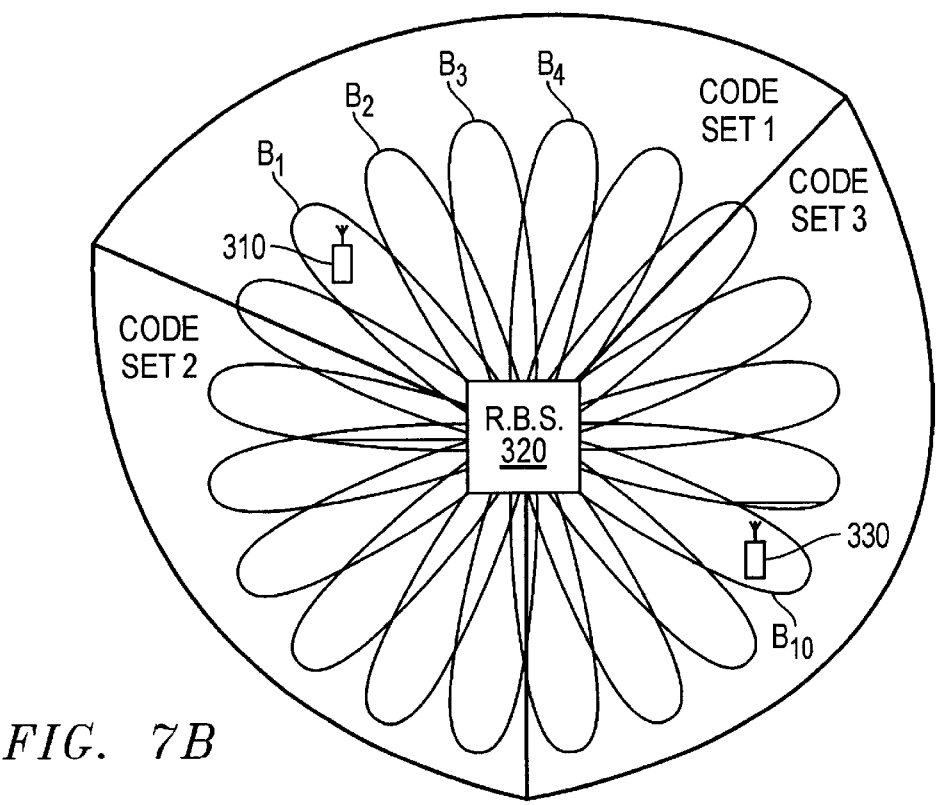
Figure 7C:
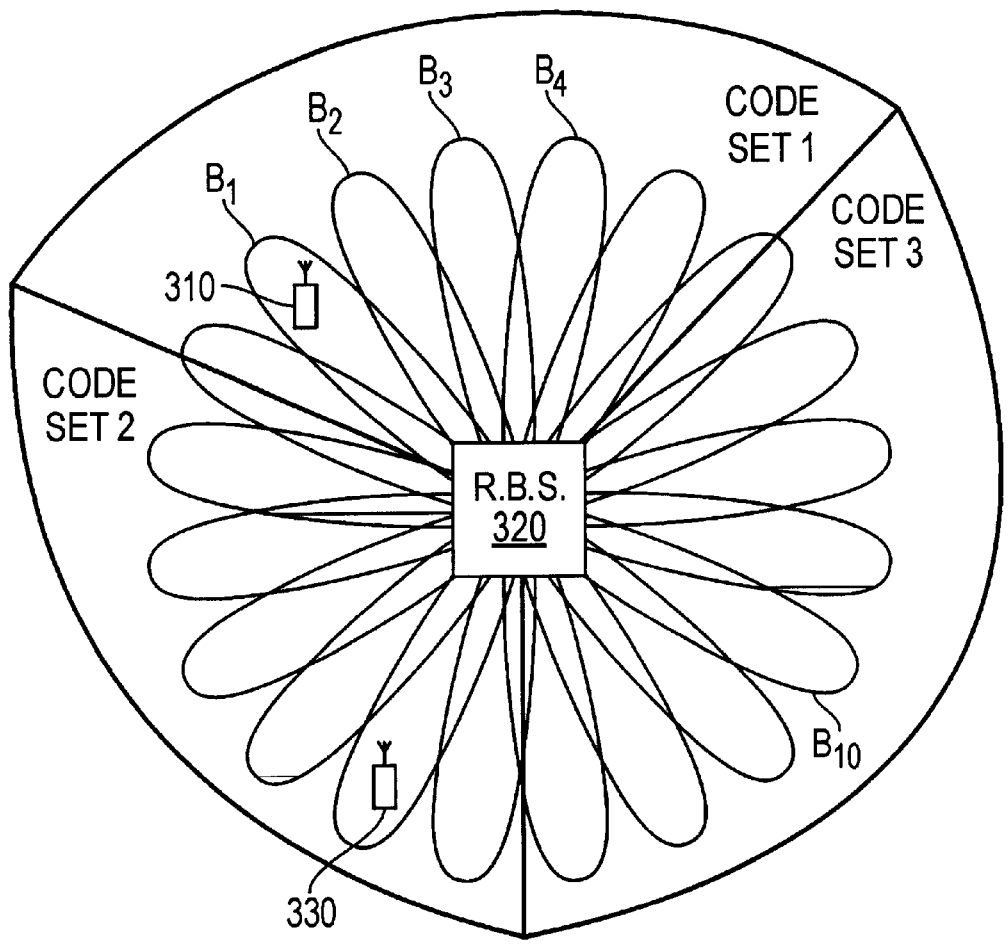

When a third code set is added, as seen in FIG. 7(*b*) the base station will redefine the regions within which the first and second code sets are currently being used and designate at least one region for the third code set. Note that the areas need not be equal in size since loading in any given area will typically be the dominant factor in determining where code sets will be allocated. This redefinition of association between code sets and geographical areas will generally require that some mobile stations which have already been allocated a code will be located in a geographical area that has been redesignated as associated with a new code set, e.g., mobile station 330 will change from a using a code in code set 2 to using a code in code set 3. For these mobile stations, a new code can be allocated at step 512. Then the new mobile station is allocated a code in an appropriate code set, which may be the code set identified in step 504 or the new code set, and a connection is established with the system.

Already existing, active connections are also periodically evaluated for optimal code allocation to reduce intra-cell interference. Thus, the process continues in the flowchart of FIG. 6 for each connected mobile station. The DOA information is again obtained at step 600. Then, at step 602, the base station determines whether that mobile station is receiving/transmitting information using a code from the proper code set given the current association between geographical areas and code sets. If so, then the process terminates for that mobile station and the system begins to evaluate another existing connection. However, if the code being used by the mobile station is associated with a different code set than that currently associated with the geographical location within in which the mobile station currently resides, e.g., because the mobile station has moved since the last check by the system, then the process moves to step 604. This concept can be seen in FIGS. 7(*b*) and 7(*c*) wherein mobile station 330 has moved from an area in which code set 3 is used to an area in which code set 2 is used.

Then, the system determines if a code is available in the code set associated with the mobile station's current geographical area, e.g., code set 2 in the above-example. If so, then a code is allocated at step 606. Otherwise, the base station performs the process described above with respect to steps 510–514 in steps 608–612 of FIG. 6, to add a new code set to the code sets currently being used in the cell.

It will be apparent to those skilled in the art that implementation of the present invention effectively provides for code handoff when either (1) a new code set is placed in service in a cell or (2) a mobile station moves within a cell to another geographical area currently being serviced by codes in a different set. In either case, code handoff reduces intra-cell interference and promotes the usage of plural, non-orthogonal code sets, which in turn increases capacity.

Moreover, it should be apparent to those skilled in the art that the assignment of code sets to geographical areas within a cell will vary over time, depending upon traffic loads in different parts of the cell. For example, if a lot of traffic is concentrated in a small portion of a cell, then one or more code sets can be used to supply the needed capacity in that portion of the cell. The code sets may cover different areas or may overlap. Of course the more overlap that is permitted, the more interference the different code sets will generate between transmissions.

The foregoing discussion has focused primarily on traffic channels which provide the active connection between the mobile station and the system. However, the system also can provide control channels which provide overhead information and allow the mobile systems to access the system. A common set of control channels can be provided by the system which are transmitted using known codes. The codes may be associated with one or more code sets, but they should be known a priori to the receivers in the mobile stations so that these units can quickly scan for, read and transmit on the control channels.

If the control channels are allocated codes from the first code set, these channels are not affected when additional code sets are introduced. Hence, independently of the number of code sets used in the cell, the mobile knows what codes the common control channels use. When the call is set up using a control channel and its known, associated code, the mobile station can be transferred to another code set (if necessary) than that used for the control channels to support its data communication.

Consider the following example. Assume a system using a combination of channelization codes and scrambling codes, where the common control channels use different channelization codes and the same scrambling code. To acquire a common control channel, a mobile will search for the scrambling code used for that control channel. When the scrambling code is identified, the mobile can read the broadcast channel, make a random access attempt and receive an access grant message on a common control channel (since this channel uses the known scrambling code and a known channelization code). The forward access message can contain information that informs the mobile as to which downlink scrambling code (i.e, which code set) to use for its assigned traffic channel(s). If a synchronization channel is used in the search for downlink scrambling codes, that channel should point to the scrambling code used by the common control channels.

Moreover, transmission power can also be considered when allocating codes. For example, a high power user that will generate a lot of interference could be allocated a code in a code set together with a number of low power users.

It will be understood that Applicants' invention is not limited to the particular embodiments described above and that modifications may be made by persons skilled in the art. The scope of Applicants' invention is determined by the following claims, and any and all modifications that fall within that scope are intended to be included therein.

We claim:

1. A method for transmitting information to a mobile station in a radiocommunication system comprising the steps of:

assigning a first code set and a second code set to a base station, codes within each of said first and second code sets being orthogonal relative to other codes within the same code set;

establishing a first angular region and a second angular region around the base station, said first code set being utilized to transmit information to mobile stations operating within the first angular region, and said second code set being utilized to transmit information to mobile stations operating within the second angular region;

providing the base station with an adaptive antenna array;

estimating an angular direction of said mobile station relative to said base station;

determining whether the angular direction of the mobile station falls within the first angular region or the second angular region;

upon determining that the angular direction of the mobile station falls within the first angular region, identifying the first code set for use in transmitting information to the mobile station;

upon determining that the angular direction of the mobile station falls within the second angular region, identifying the second code set for use in transmitting information to the mobile station;

selecting a code in the identified code set;

spreading and scrambling the information using the selected code;

determining from the angular direction of the mobile station, whether the mobile station is operating in an area where cross-correlation between the first and second code sets is likely to cause interference; and upon determining that the mobile station is operating in an area where cross-correlation between the first and second code sets is likely to cause interference, transmitting the spread and scrambled information to the mobile station utilizing the adaptive antenna to increase antenna gain in the angular direction of the mobile station, thereby reducing interference due to cross-correlation of the codes.

2. The method of claim 1, further comprising the step of:
providing said base station with a set of spatially distributed antennas.

3. The method of claim 1, wherein each code within said first and second code sets includes a channelization code and a scrambling code.

4. The method of claim 1, wherein said step of selecting a code in the identified code set includes selecting a code from the identified code set until all codes in the identified code set are allocated.

5. The method of claim 1, wherein said step of establishing first and second angular regions around the base station includes establishing the first and second angular regions based upon locations of active mobile stations.

6. The method of claim 1, further comprising the steps of:
determining that an active mobile station has entered the first angular region;
determining whether the active mobile station is assigned a code in the first code set;
if the active mobile station Is not assigned a code in the first code set, determining whether a code is available in the first code set; and
if a code is available from the first code set, assigning the available code to the active mobile station.

7. The method of claim 6 further comprising, after determining that the active mobile station has entered the first angular region, assigning a temporary code from a default set of codes to the active mobile station for establishing a traffic channel.

8. The method of claim 6 further comprising, upon determining that a code is not available from the first code set, the steps of:
assigning an available code from the second code set to the active mobile station;
adjusting the angular boundaries of the first and second angular regions to include the active mobile station in the second angular region; and reassigning codes from me second code set to other active mobile stations that were operating in the first angular region prior to adjusting the angular boundaries, but are operating in the second angular region as a result of adjusting the boundaries.

9. A method for transmitting information to a mobile station in a radiocommunication system comprising the steps of:
assigning a first code set and a second code set to a base station, codes within each of said first and second code sets being orthogonal relative to other codes within the same code set;
establishing a first angular region and a second angular region around the base station, said first code set being utilized to transmit information to mobile stations operating within the first angular region, and said second code set being utilized to transmit information to mobile stations operating within the second angular region;
determining whether the mobile station is located in the first or second angular region;
determining based at least in part on the angular region in which the mobile station is located, an antenna gain associated with at least one antenna element for transmitting said Information to said mobile station;
selecting a code from one of said first code set and said second code set based, at least in part, on said determined antenna gain; and
transmitting said information to said mobile station using said selected code and said determined antenna gain.

10. The method of claim 9, further comprising the step of:
providing said base station with an adaptive antenna array including said at least one antenna element.

11. The method of claim 9, further comprising the step of:
providing said base station with a set of spatially distributed antennas including said at least one antenna element.

12. The method of claim 9, wherein each code within said first and second code sets includes a channelization code and a scrambling code.

13. The method of claim 9, wherein said step of establishing first and second angular regions around the base station includes establishing the first and second angular regions based upon locations of active mobile stations.

14. The method of claim 9 wherein said step of determining an antenna gain further comprises the step of:
estimating a position of said mobile station; and
determining said antenna gain based on said estimated position.

15. The method of claim 9, wherein said steps of determining an antenna gain and selecting a code are performed in a base station.

16. The method of claim 9, wherein said steps of determining an antenna gain and selecting a code are performed in a radio network controller.

17. The method of claim 9, further comprising the step of:
broadcasting overhead information on a control channel using a predetermined channelization code and scrambling code associated with one of said first code set and said second code set.

18. A radiocommunication system comprising:
a base station for receiving uplink signals from a mobile station and determining an antenna gain for transmitting downlink signals to said mobile station, said base station including an adaptive antenna for varying the antenna gain;

a first code set and a second code set assigned to the base station, codes within each of said first and second code sets being orthogonal relative to other codes within the same code set, and being utilized to spread information;

means for designating a first angular region and a second angular region around the base station, said first code set being selected to transmit information to mobile stations operating within the first angular region, and said second code set being selected to transmit information to mobile stations operating within the second angular region;

means for determining the angular direction of the mobile station; and means for transmitting the information to the mobile station utilizing the adaptive antenna to increase antenna gain in the angular direction of the mobile station when the angular direction of the mobile station indicates that the mobile station is operating in an area where cross-correlation between the first and second code sets is likely to cause interference, thereby reducing interference due to cross-correlation of the codes.

19. The radiocommunication system of claim 18, wherein said means for allocating a code is disposed in said base station.

20. The radiocommunication system of claim 18, wherein said means for allocating a code is disposed in a radio network controller.

21. The radiocommunication system of claim 18, wherein said at least one code include a channelization code and a scrambling code.

22. The radiocommunication system of claim 18, wherein said base station transmits a common control channel using a channelization code and a scrambling code which are known to mobile stations.

* * * * *